United States Patent
Hill et al.

(10) Patent No.: US 6,825,640 B1
(45) Date of Patent: Nov. 30, 2004

(54) GENERATOR ARRANGEMENTS

(75) Inventors: Jason E Hill, Newcastle upon Tyne (GB); Steven J Mountain, Auckland (NZ); Alan J Mitcham, Ponteland (GB)

(73) Assignee: Rolls-Royce plc, London (GB)

( * ) Notice: Subject to any disclaimer, the term of this patent is extended or adjusted under 35 U.S.C. 154(b) by 158 days.

(21) Appl. No.: 10/295,845

(22) Filed: Nov. 18, 2002

(30) Foreign Application Priority Data

Nov. 30, 2001 (GB) .............................................. 0128662

(51) Int. Cl.$^7$ .............................................. H02P 11/06
(52) U.S. Cl. ............................... 322/46; 322/59; 322/89; 363/37
(58) Field of Search ............................ 322/10, 12, 46, 322/59, 89; 363/37

(56) References Cited

U.S. PATENT DOCUMENTS

| | | | | |
|---|---|---|---|---|
| 5,225,712 A | * | 7/1993 | Erdman | 290/44 |
| 5,384,527 A | * | 1/1995 | Rozman et al. | 322/10 |
| 5,387,859 A | * | 2/1995 | Murugan et al. | 322/10 |
| 5,594,322 A | * | 1/1997 | Rozman et al. | 322/10 |
| 5,705,902 A | * | 1/1998 | Merritt et al. | 318/254 |
| 5,825,113 A | * | 10/1998 | Lipo et al. | 310/181 |
| 6,049,195 A | * | 4/2000 | Geis et al. | 322/46 |
| 6,239,583 B1 | | 5/2001 | Lindbery | 322/46 |
| 6,346,797 B1 | * | 2/2002 | Perreault et al. | 322/29 |
| 6,661,206 B2 | * | 12/2003 | Gallegos-Lopez | 322/23 |

FOREIGN PATENT DOCUMENTS

GB 2117143 P 10/1983

* cited by examiner

*Primary Examiner*—Nicholas Ponomarenko
(74) *Attorney, Agent, or Firm*—W. Warren Taltavull; Manelli, Denison & Selter PLLC

(57) ABSTRACT

A permanent magnet fault tolerant generator 32 is driven by a variable speed shaft 34 to create AC power at terminals 36, converted at 40 to DC power before being applied to a load 38. The converter 40 is a bi-directional device which rectifies AC to DC and also acts as an inverter to synthesize AC from the DC. This synthesized AC waveform is imposed on the terminals 36 to maintain a constant magnitude generator output voltage, regardless of the speed of the shaft 34, and thus regardless of the EMF of the generator. This results in reactive currents flowing between the generator 32 and the converter 40, but allows the generator design have a reduced current rating, resulting in improved generator size and weight.

16 Claims, 5 Drawing Sheets

GENERATOR ARRANGEMENTS

The present invention relates to electrical generator arrangements and particularly to generator arrangements which draw power from a generator having a large range of operating speeds, during use. Applications of the invention are envisaged in the aerospace field, for instance.

Gas turbine engines are conventionally used as aircraft engines to provide propulsive thrust for the aircraft. In addition, gas turbine aircraft engines are required to provide a source of electrical power for accessories on the engine and on the aircraft upon which the engine is operationally mounted. The conventional way of extracting electrical power from a gas turbine engine is to provide a mechanical drive from a compressor shaft of the engine, through a suitable gearbox, to the generator. The gearbox and generator are usually mounted on or within the fan casing of the engine or on the engine core. The presence of these components adds undesirable weight and complexity to the engine.

Permanent magnet generators have been considered for use in these situations. They are a well understood design of generator for which various magnetic configurations have been proposed. They can be robust and reliable in use. However, the EMF (electro motive force) of a permanent magnet generator is proportional to the speed at which the generator rotor is rotated. The range of rotation speeds within a gas turbine aircraft engine can be considerable, varying between the rotation speed when idle on the ground, and the maximum speed during take-off. However, the generator arrangement is required to deliver constant and relatively low voltages to the systems being supplied. The generator may also be required to be "fault tolerant". That is, the generator may be required to have sufficient inductance to ensure that when the terminals are short-circuited at any generator speed, the short circuit current does not exceed the maximum rated current.

The invention provides an aerospace generator arrangement operable to provide DC power from a rotating member, the arrangement having a permanent magnet generator driven, in use, by the rotating member to provide AC power at the output terminals of the generator, converter means operable to convert the AC output to provide the DC power, and control means which, in use, maintain constant AC voltage at the generator output terminals, regardless of the generator EMF.

The generator is preferably fault tolerant. Preferably the control means comprise a voltage synthesiser arrangement operable to impose a synthesised voltage waveform on the generator output terminals. The voltage synthesiser may be a pulse width modulation-type synthesiser device. The voltage synthesiser preferably creates the synthesised voltage waveform from the DC power.

The rotating member is preferably driven from an engine and may be driven from a compressor, shaft of a gas turbine engine, preferably from the low pressure shaft of a multi-shaft gas turbine engine.

The invention also provides an aerospace generator arrangement operable to provide DC power for use within an aircraft, the arrangement comprising an aero engine which drives a permanent magnet generator to provide AC power at the output terminals of the generator, converter means operable to convert the AC output to provide the DC power, and control means which, in use, maintain constant AC voltage at the generator output terminals, regardless of the generator EMF.

Preferably, the aero engine has at least one rotary shaft connecting a turbine and a compressor, the generator being driven by or from the said shaft. Preferably the engine has more than one shaft. The driving shaft may be the low pressure shaft.

The control means may comprise a voltage synthesiser arrangement operable to impose a synthesised voltage wave form on the generator output terminals. The voltage synthesiser may be a pulse width modulation-type synthesiser device. The voltage synthesiser may create the synthesised voltage waveform from the DC power.

In a further aspect, the invention provides an aircraft incorporating a generator arrangement as aforesaid.

Examples of the present invention will now be described in more detail, by way of example only, and with reference to the accompanying drawings, in which.

Figure 7:
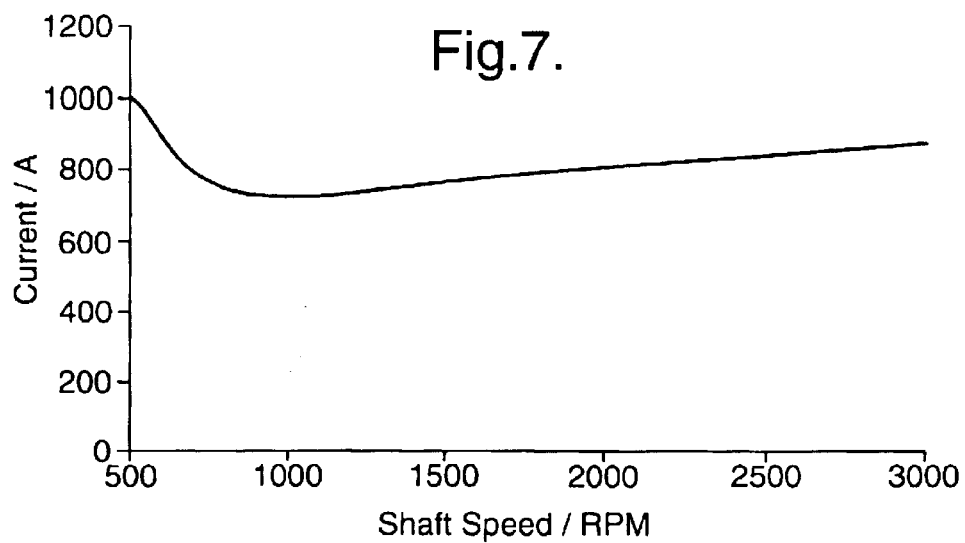
Figure 8:
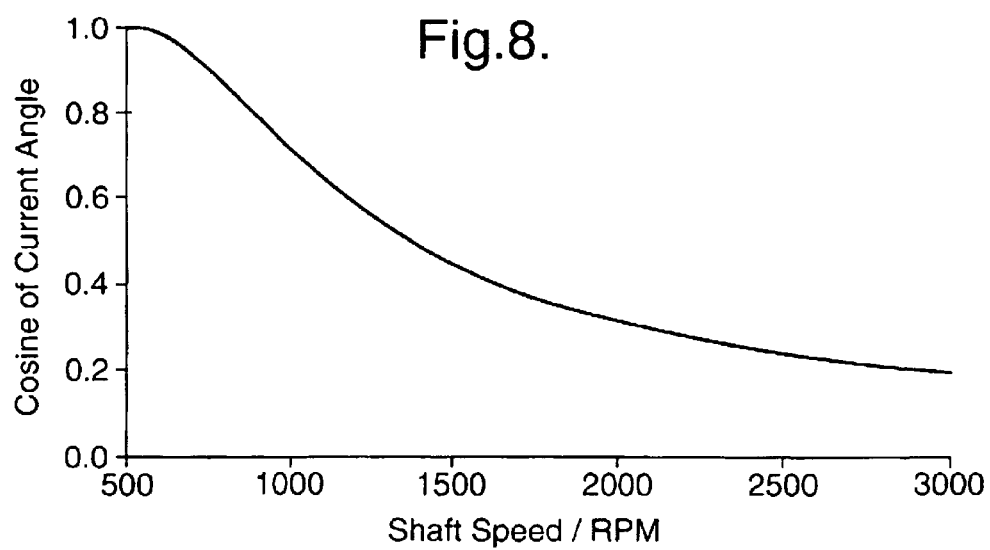
Figure 9A:
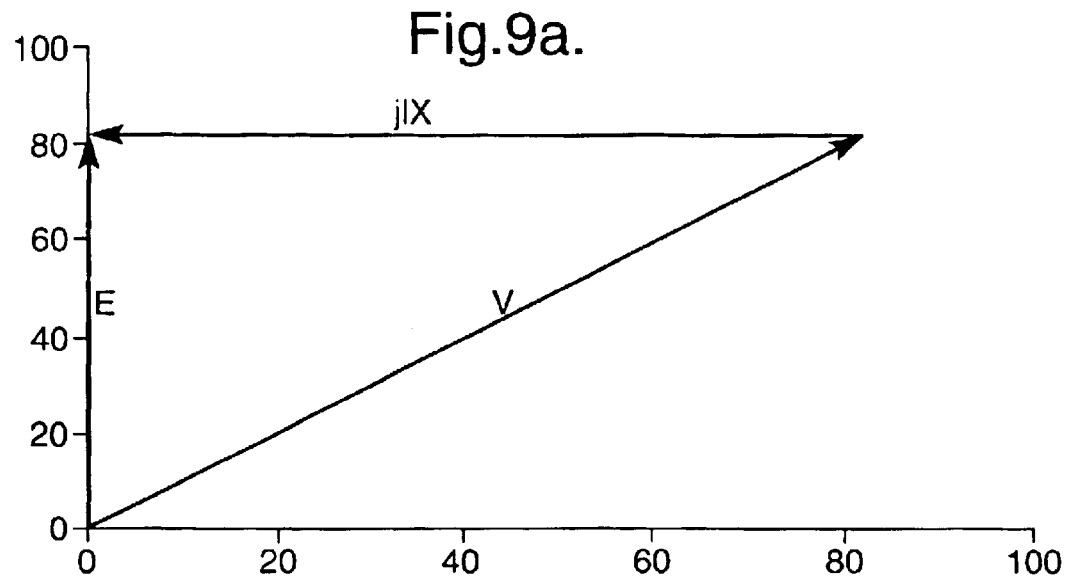
Figure 9B:
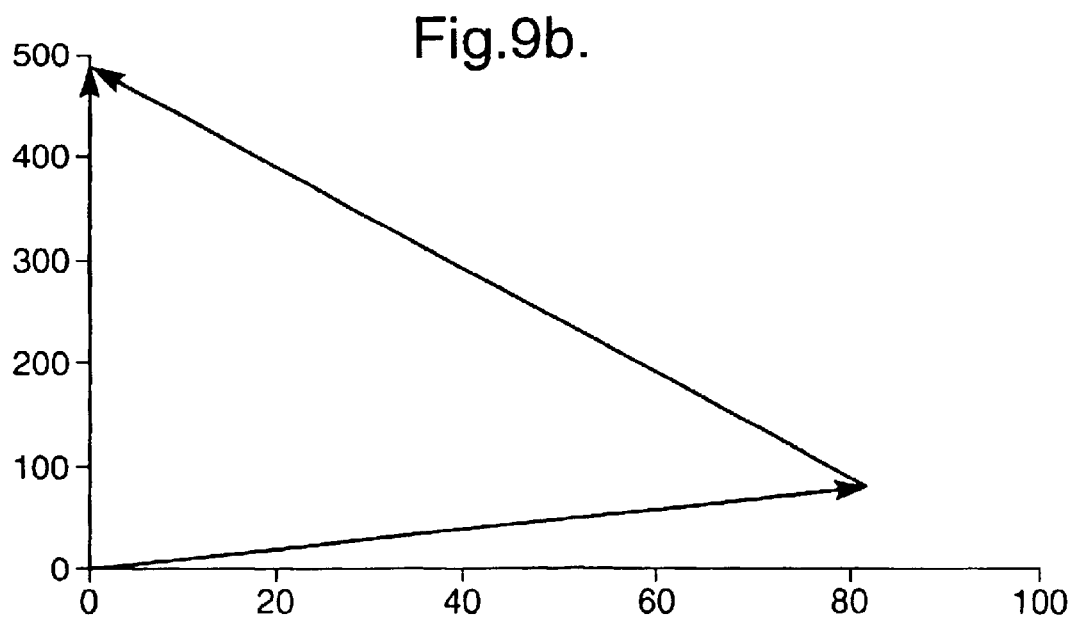

FIGS. 7 and 8 show current and internal power factor as a function of shaft speed in a worked example; and FIGS. 9a and 9b show the phasor diagrams of the arrangement of FIGS. 7 and 8, respectively at minimum and maximum shaft speed.

Figure 1:
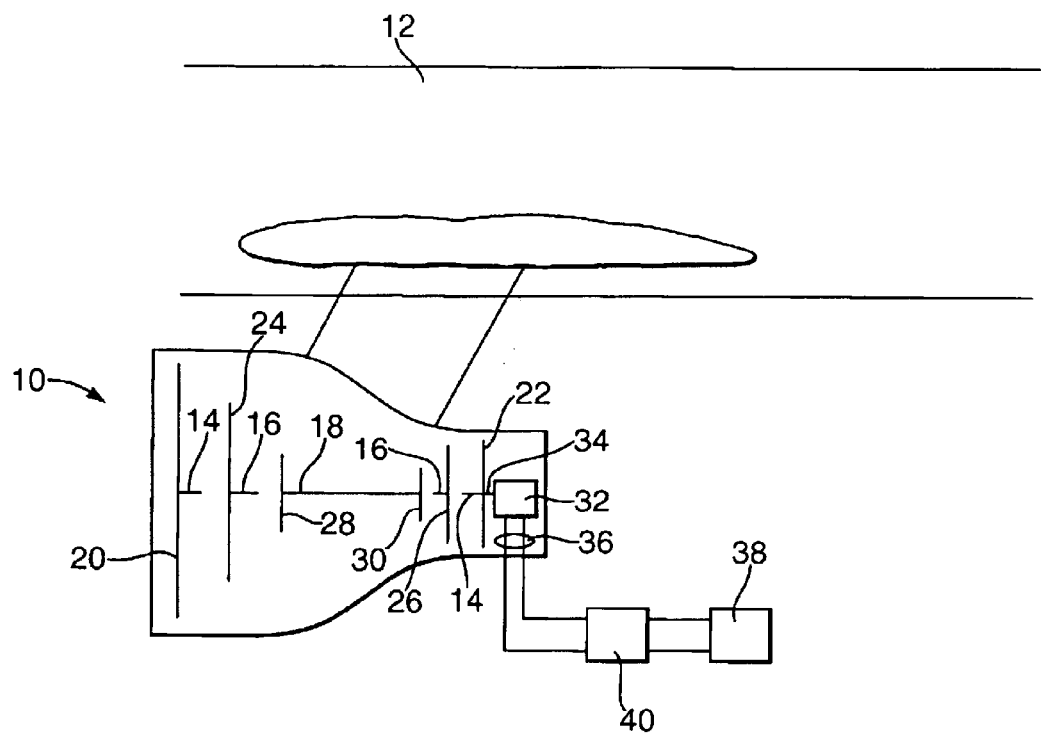
FIG. 1 is a schematic diagram of an airframe and engine with which a generator arrangement according to the present invention is used.

FIG. 1 shows an aero engine 10 deployed on the airframe of an aircraft 12. In this example, the engine 10 is of the ducted fan by-pass type and has three relatively rotatable shafts called the low pressure shaft 14, intermediate pressure shaft 16 and high pressure shaft 18. The low pressure shaft 14 is a load transmitting shaft interconnecting a fan 20 and a low pressure turbine assembly 22 located at the downstream end of the engine 10. The intermediate pressure shaft 16 is a hollow load transmitting shaft concentrically disposed around the shaft 14 and interconnecting an intermediate pressure compressor 24 with an intermediate pressure turbine 26. The high pressure shaft 18 is similarly a hollow load transmitting shaft concentric with the shafts 14, 16 and interconnecting a high pressure compressor 28 and a high pressure turbine 30.

A generator 32 is shown diagrammatically in FIG. 1 as being driven by an extension 34 of the low pressure shaft 14. Many other arrangements could be used for incorporating the generator 32 into the architecture of the engine 10.

The generator 32 is a permanent magnet generator and accordingly, will provide AC power at its output terminals 36 when turned by the shaft 14. Electrical systems around the aircraft 12, illustrated diagrammatically as a load 38, may require DC or AC power. In either case, a fixed voltage level will be required. Consequently, a converter 40 is provided to convert the AC power from the terminals 36, to provide DC power to the load 38. The invention allows the DC voltage level to be constant, regardless of generator speed, and thus, the DC power can be converted to AC power of constant magnitude and frequency, regardless of generator speed.

In accordance with the invention, the converter 40 incorporates a control arrangement which, in use, maintains a constant magnitude AC voltage at the generator output terminals 36, regardless of generator EMF, as will be described in more detail below.

Figure 2:
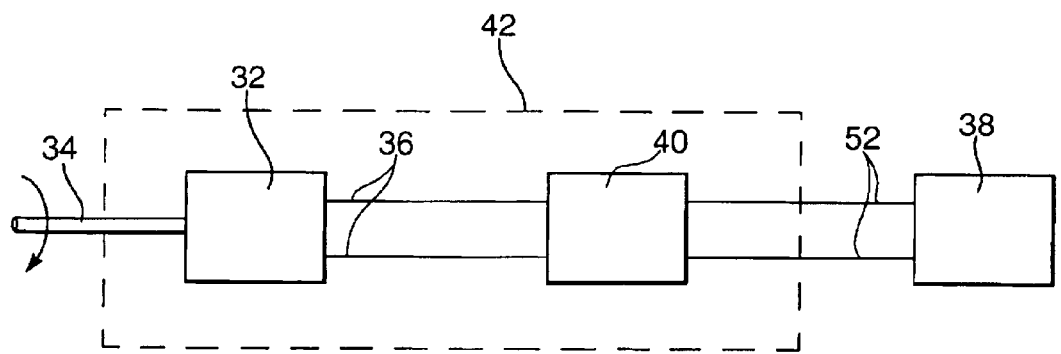
FIG. 2 is a schematic diagram of the generator arrangement.

FIG. 2 shows in diagrammatic form the generator arrangement, indicated generally at 42, driven by the shaft extension 34 and providing DC power to the load 38. As can be seen from that drawing, the shaft extension 34 drives the generator 32 to create an EMF within the generator and to provide AC voltage at the terminals 36. The converter 40 converts the AC supply to a DC supply for onward transmission to the load 38, perhaps via another stage of power conversion, such as in the case of an AC load, as noted above.

Figure 3:
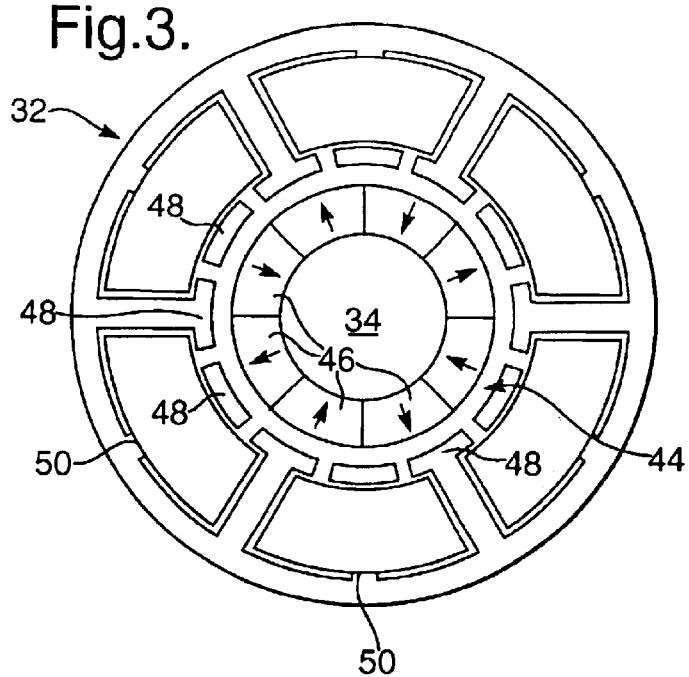
FIG. 3 is an axial section of the generator, showing the magnetic arrangements.

FIG. 3 is a partly schematic view along the axis of the generator 32, showing one example of a magnetic arrangement for use in the generator 32. The illustrated generator arrangement is a modular winding arrangement typical of that used in safety critical fault-tolerant applications. The central rotor 44 of the generator 32 has permanent magnet segments oriented to create flux generally radially of the rotor 44, but each reversed in polarity with respect to its neighbour. The stator of the generator 32 has teeth 48 arrayed around the rotor 44. Coils 50 are provided around alternate teeth 48. The coils 50 would preferably be wound as a multi-phase winding, such as a 3 or 6-phase winding. When wound as a 3-phase winding, current directions at any instant would be the same in the first and fourth coils 50 (counting around the stator), in the second and fifth coils, and in the third and six coils. Consequently, as the rotor 44 turns, a moving flux pattern is created within the stator of the motor, thus creating an EMF in the coils 50, which drives the output of the generator 32. Further details of this machine topology, and alternative permanent magnet generator topologies and their performance are well known to the skilled reader and thus not further described here.

The magnitude of the EMF produced by the generator 32 depends on the speed of rotation of the rotor 44 relative to the stator. The frequency of the EMF naturally also depends on the rotor speed. When the generator 32 is used in the arrangement of FIG. 2, the generator 32 will create the EMF, as described, and a voltage at the terminals 36. The frequency of the EMF and the terminal voltage will be the same, governed by the speed of the shaft extension 34. The magnitude of the terminal voltage is related to the EMF within the generator 32 by a relationship which depends on the internal impedance of the generator 32, the current being drawn, and the phase angle between the EMF and voltage, as will be described in more detail below.

The arrangement 42 is operated according to a strategy which applies control to the terminal voltage. In practice, the generator will desirably be a 3-phase generator, with control applied to the terminal voltage of each phase. In the following description a single phase, preferably of a 3-phase arrangement, will be described.

Figure 4:
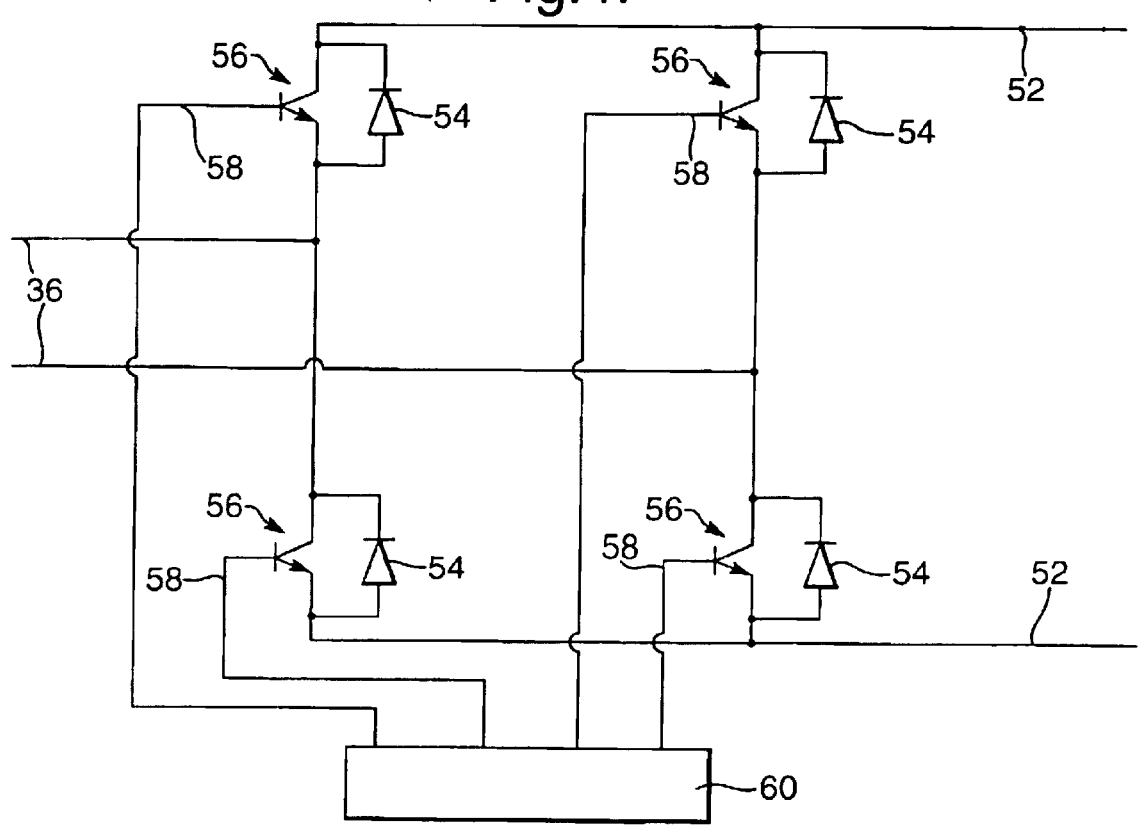
FIG. 4 is a part-schematic circuit diagram of the converter.

In this example, control is achieved by operation of the converter arrangement 40, which will now be described in more detail, with reference to FIG. 4. The converter 40 is connected between the output terminals 36, shown to the left of FIG. 4, and to load terminals 52, shown to the right in FIG. 4. Consequently, the terminals 36 carry AC, while the terminals 52 carry DC. The circuit 40 forms a bridge between the terminals 36, 52. Each arm of the bridge includes a switching device, shown as a bipolar transistor in this example. Other switching devices could be used. In this example, each diodes 54 is connected across the collector and emitter of a respective transistor 56. The diodes 54 are connected to form a bridge rectifier, rectifying the AC at 36, to provide DC at 52. The presence of the transistors 56 (or other switching devices) also allows the circuit 40 to be used also as an inverter, converting DC at 52 to AC at 36. For this purpose, the base 58 of each of the transistors 56 is connected to a control circuit 60 which may, for instance, be a microprocessor based circuit. This allows individual transistors 56 to be switched on or off. In particular, it can be seen from FIG. 4 that by switching pairs of transistors, the DC at load terminals 52 can be applied with either polarity to the terminals 36. When drawn as shown in FIG. 4, turning on the transistors illustrated at the top left and bottom right of the circuit will connect the DC to the terminals 36 with one polarity, while turning on the transistors shown at the bottom left and top right of the drawing will connect the DC with the alternative polarity.

Consequently, appropriate switching of the transistors 56 to apply DC to the terminals 36 can be used to synthesise an AC voltage at the terminals 36, the amplitude, frequency and phase of the waveform being controlled by the timing of transistor switching, and thus being under the direct control of the circuit 60. The technique of operating a transistor bridge of the type shown in FIG. 4, to create a desired voltage waveform by pulse width modulation (PWM) techniques from an DC supply, is well known in itself.

The ability of the control circuit 60 to achieve voltage synthesis at the terminals 36 allows the AC voltage at the terminals 36 to be maintained constant in magnitude. In particular, the control circuit 60 is able to synthesise a voltage which remains constant (in magnitude) at the terminals 36, regardless of the EMF within the generator 32, and thus regardless of the speed of rotation of the shaft extension 34. Thus, the magnitude of the voltage to be synthesised remains constant, but the phase angle will depend on the phase angle of the EMF. The control circuit 60 therefore requires information about the EMF phase angle. This information may be obtained from an appropriate sensor, such as a shaft position sensor within the generator, or by measuring currents and calculating the EMF which must be present to create the measured currents.

The significance and implications of the voltage synthesis regime can now be explained in more detail, by considering the circuit theory underlying the arrangement.

Figure 5:
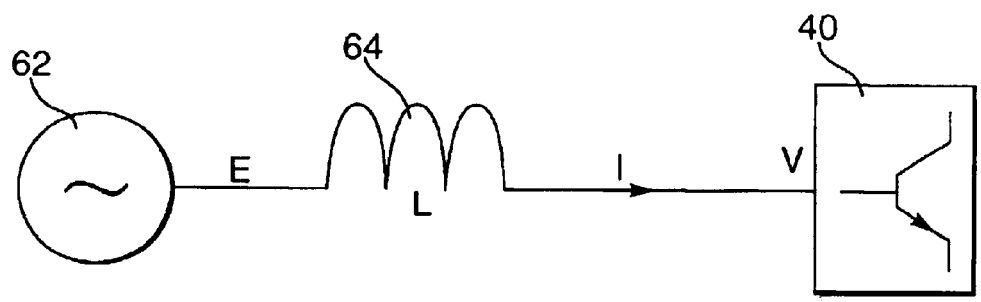
FIG. 5 is an equivalent circuit of the arrangement.

FIG. 5 shows a schematic electrical circuit equivalent in the generator and rectifier arrangement of the previous drawings. The generator 32 is modelled as an idealised sinusoidal EMF 62 in series with an inductor L, representing the inductance of the generator 32. Current I flows from the output terminal 36 to the converter 40, which is generating a voltage V by synthesis in the manner described above. Appropriate use of the PWM techniques described above allows the converter 40 to adjust the amplitude of the voltage V and to control the phase angle between the voltage V and the EMF E. This results in a phasor diagram as shown in FIG. 6.

Figure 6:
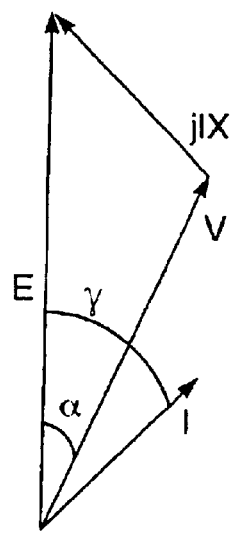
FIG. 6 is the related phasor diagram.

If it is assumed that the PWM converter 40 operates at a switching frequency high enough for harmonics to be negligible, the phasor diagram of FIG. 6 can be described by the following statements:—

$E = \sqrt{2}E \sin \theta$ $V = \sqrt{2}V \sin(\theta - \alpha)$ $I = \sqrt{2}I \sin(\theta - \gamma)$ $E - V = X \dfrac{dI}{d\theta}$ $P = EI \cos \gamma$ $Q = EI \sin \gamma$ $E - V \cos \alpha = IX \sin \gamma$ $V \sin \alpha = IX \cos \gamma$ where:
- bold text indicates a phasor
- E is the generator EMF
- V is the converter voltage
- I is the current
- X is the generator impedance=$\omega L$
- $\alpha$ is the phase angle between E and V
- $\gamma$ is the phase angle between E and I, also known as the current angle
- $\theta = \omega t$
- $\omega$ is the angular frequency of E
- L is the generator inductance
- Q is the reactive power generated by E
- P is the active power generated by E The relationships from the phasor diagram of FIG. 6 can be used to set various ratings of the generator 32, as follows.

It can be assumed that the rated power demand imposed by the load 38 is constant, regardless of the speed of the generator 32, as would normally be the case in relation to electrical power supply to a finite system such as an aeroplane. The maximum current rating of the system can therefore be minimised by minimising the current at the lowest generator speed (corresponding with the lowest generator EMF). If reactive power generation is set to be zero at minimum speed, i.e. the phase angle $\gamma$ is zero at minimum generator speed $\omega_{min}$ then the rated value of the current (i.e. the maximum current which the generator and converter must be able to accommodate while maintaining appropriate safety margins and the like) would be given by:—

$$I_{rated} = \frac{P_{rated}}{E_{min}} \qquad \text{(Equation 1)}$$

where
- $P_{rated}$ is the rated value of P
- $E_{min}$ is the value of E when $\omega = \omega_{min}$ Another consideration on generator design, particularly relevant to the design of a system for use in aircraft, is the fault tolerance of the system. In an aircraft environment, the system must be safe even in the event of a fault. A generator can be defined as fault tolerant if it has sufficient inductance to ensure that when the generator terminals are short circuited at any speed, the short circuit current $I_{s/c}$ does not exceed the maximum rated current. It is apparent from considering FIGS. 5 and 6 that at short circuit, current is given by:

$$I_{s/c} = \frac{E}{\omega L} \qquad \text{(Equation 2)}$$

Consequently, since E is proportional to X for all speeds, the steady short circuit current will be constant for all speeds, and given by:

$$I_{s/c} = \frac{E_{min}}{\omega_{min} L} \qquad \text{(Equation 3)}$$

It is therefore desirable to set the maximum rated current to be equal to the calculated short circuit current to ensure that the generator can sustain a short circuit indefinitely at all speeds. In consequence, combining Equation 3 with Equation 1, and setting $I_{s/c} = I_{rated}$, provides the following:

$$L = \frac{E_{min}}{\omega I_{rated}} = \frac{E_{min}^2}{\omega_{min} P_{rated}} \qquad \text{(Equation 4)}$$

This has implications for generator design and, in normal generator design parlance, is equivalent to setting a generator synchronous reactance of 1.0 per unit.

Having considered the minimum speed in order to set the current rating (Equation 1), it can be seen that at this current rating and speed, the maximum power will occur when the current angle $\gamma$ is zero. In this condition, the voltage, V, at the converter will be given as:

$$V = \sqrt{E_{min}^2 + (I_{rated}\omega_{min}L)^2} \qquad \text{(Equation 5)}$$

Substituting Equations 4 and 1 allows Equation 5 to be simplified to:

$$V = \sqrt{2} E_{min} \qquad \text{(Equation 6)}$$

Thus, this provides the relationship between the emf at minimum speed, and the voltage required of the converter 40.

Thus, having established the current ($I_{rated}$) at minimum speed, and the voltage, V, at minimum speed, the invention provides control of the voltage (by means of the control circuit 60) so that as speed is increased, the magnitude of the voltage, V, is held constant. Thus, this voltage defines the required voltage rating of the converter 40.

The generator is preferably designed to maximise the value of $E_{min}$ without causing V to exceed the maximum rating of the converter 40. Given the assumption that rated power is required throughout the speed range, this minimises the current required at the minimum speed condition and also minimises the current rating throughout the speed range.

The current at any speed can be shown to be related to E, V, X and P by the following equation:

$$I^2 = \frac{E^2 + V^2}{X^2} - \frac{2}{X^2}\sqrt{V^2 E^2 - P^2 X^2} \qquad \text{(Equation 7)}$$

By setting P to $P_{rated}$, using Equation 6, and setting:

$$\frac{E}{\omega} = \frac{E_{min}}{\omega_{min}} \qquad \text{(Equation 8)}$$

Equation 7 can be re-written as:

$$I = \frac{P_{rated}}{E_{min}}\sqrt{1 - 2\frac{\omega_{min}}{\omega} + 2\left(\frac{\omega_{min}}{\omega}\right)^2} \qquad \text{(Equation 9)}$$

The significance of the equations set out above can be further explained by reference to an example of a generator driven by the low pressure shaft of a gas turbine engine. The generator in the example is a three phase generator. It will be apparent to the skilled reader how the principles described above in relation to a single phase can be used for another number of phases, and particularly for three phases.

A three phase generator is rated to produce 250 kW when the LP shaft rotates at any value between 500 and 3000 rpm. The generator is assumed to be a six pole machine (3 pole pair) and is fed through a gearbox with a 12:1 step-up ratio. The generator therefore rotates at an angular frequency of between 1885 and 11310 rad s$^{-1}$. The generator EMF is 490 V at full speed (and is 82 V at minimum speed) so that the converter AC output voltage is 115 V at all speeds, which is a common voltage requirement of existing aircraft systems. This gives an inductance of 42 $\mu$H and a current rating of 1021 A. FIG. 7 is a plot of the current across the whole LP shaft speed range. At the highest speeds the current approaches the minimum speed design point but never reaches it.

FIG. 8 is a plot of the generator internal power factor (cos γ) as a function of the LP shaft speed. At the minimum speed, the power factor is unity and it approaches zero at the highest speeds.

FIG. 9 shows the phasor diagrams at minimum speed (FIG. 9a) and maximum speed (FIG. 9b). Because the value of V is fixed, the angle α between E and V is constant at π/4 for rated power as can be seen from the equation for sin α set out above, in relation to FIGS. 5 and 6.

At minimum speed the current is in phase with the generator EMF. At higher speeds the converter voltage is lower than it would be at unity power factor.

The significance of the arrangements described above, and of their operation, can be summarised as follows. The permanent magnet generator is operated with a constant terminal voltage over the entire operational speed range. The maximum terminal voltage is set by considering the current at the minimum operational speed, and the machine inductance is set to a value which provides fault tolerance, as set out above. As the generator speed increases through the range, the generator EMF rises, but the terminal voltage is held fixed, by virtue of the converter varying the internal power factor angle to satisfy the generator phasor diagram as described above. The generator can therefore be designed to have a high EMF at high speeds. The terminal voltage is set so that at maximum speed, the terminal voltage does not exceed the converter voltage rating. This means that the current rating is minimised, and in particular, is reduced from that required when the generator is not operated in accordance with the invention, thus resulting in potentially significant improvements in generator system size and weight. In addition to reducing the cost of the generator, the reduced size and weight will have consequent significant economic advantages in relation to the operation of an aircraft to which the arrangement is fitted.

The difference between the generator EMF and the fixed terminal voltage is accommodated by adjusting the phase angle between the EMF and the voltage, and circulating reactive power between the generator and the converter, in order to accommodate the difference. This enables the control provided by the circuit 60 to be relatively simple, requiring a single input to set the phase angle between the generator EMF and the terminal voltage, and producing a single output in the form of active power delivered to the load 38. Having set the design parameters of the generator as explained above, appropriate adjustment of phase at any speed allows the extracted power to be controlled from zero to the rated value, assumed to be constant with speed, and without exceeding the rated current of the machine. At all speeds, the extracted active power can be zero but, apart from at the very lowest powers and speeds, there will always be some reactive current flowing between the generator and converter. In the event of a failure, the converter will act as a shorting device, drawing rated current at all speeds, as set out above.

Many variations and modifications can be made to the apparatus described above, without departing from the scope of the present invention. In particular, many different specific designs for the generator, converter and control circuit can be envisaged, while still operating according to the control strategy explained above. The invention is expected to provide significant benefits for power generation from variable speed permanent magnet generators when used for aerospace applications, but may be applicable in other situations which require a fault tolerant machine which generates power (but is not used as a motor) and which operates over a very wide speed range, and in a situation for which reduced generator weight and cost is advantageous. Other possible applications may relate to industrial gas turbines, wind or wave power generation and electrical vehicles.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. An aerospace generator arrangement operable to provide DC power from a rotating member, the arrangement having a permanent magnet generator driven, in use, by the rotating member to provide AC power at the output terminals of the generator, converter means operable to convert the AC output to provide DC power at substantially constant voltage, and control means which, in use, maintain constant magnitude AC voltage at the generator output terminals, regardless of the generator EMF.

2. An arrangement according to claim 1, wherein the generator is fault tolerant.

3. An arrangement according to claim 1, wherein the control means comprise a voltage synthesiser arrangement operable to impose a synthesised voltage waveform on the generator output terminals.

4. An arrangement according to claim 3, wherein the voltage synthesiser is a pulse width modulation-type synthesiser device.

5. An arrangement according to claim 3, wherein the voltage synthesiser creates the synthesised voltage waveform from the DC power.

6. An arrangement according to claim 1, wherein the rotating member is driven from an engine.

7. An arrangement according to claim 6, wherein the rotating member is driven from a compressor shaft of a gas turbine engine.

8. An arrangement according to claim 7, wherein the shaft is the low pressure shaft of a multi-shaft gas turbine engine.

9. An aerospace generator arrangement operable to provide power for use within an aircraft, the arrangement comprising an aero engine which drives a permanent magnet generator to provide AC power at the output terminals of the generator, converter means operable to convert the AC output to provide DC power at substantially constant voltage, and control means which, in use, maintain constant magnitude AC voltage at the generator output terminals, regardless of the generator EMF.

10. An arrangement according to claim 9, wherein the generator is fault tolerant.

11. An arrangement according to claim 9, wherein the aero engine has at least one rotary shaft connecting a turbine and a compressor, the generator being driven by or from the said shaft.

12. An arrangement according to claim 11, wherein the engine has more than one shaft, and the driving shaft is the low pressure shaft.

13. An arrangement according to claim 9, wherein the control means comprise a voltage synthesiser arrangement operable to impose a synthesised voltage wave form on the generator output terminals.

14. An arrangement according to claim 13, wherein the voltage synthesiser is a pulse width modulation-type synthesiser device.

15. An arrangement according to claim 13, wherein the voltage synthesiser is operable to create the synthesised voltage waveform from the DC power.

16. An aircraft incorporating a generator arrangement as set out in claim 1.

* * * * *